(12) United States Patent
Reich et al.

(10) Patent No.: US 7,976,363 B2
(45) Date of Patent: Jul. 12, 2011

(54) DUST CONTAINER OF A HAND-HELD POWER TOOL

(75) Inventors: Doris Reich, Stuttgart (DE); Steffen Tiede, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 11/911,762

(22) PCT Filed: Nov. 15, 2006

(86) PCT No.: PCT/EP2006/068472
§ 371 (c)(1),
(2), (4) Date: Oct. 17, 2007

(87) PCT Pub. No.: WO2007/080002
PCT Pub. Date: Jul. 19, 2007

(65) Prior Publication Data
US 2009/0272751 A1 Nov. 5, 2009

(30) Foreign Application Priority Data

Dec. 29, 2005 (DE) .................. 10 2005 062 886

(51) Int. Cl.
*B24B 55/04* (2006.01)
(52) U.S. Cl. .............. 451/451; 451/453; 451/456
(58) Field of Classification Search ........... 451/451–456
See application file for complete search history.

(56) References Cited

U.S. PATENT DOCUMENTS

| 2,751,729 | A | * | 6/1956 | Christiansen | 451/442 |
|---|---|---|---|---|---|
| 3,583,821 | A | * | 6/1971 | Shaub et al. | 408/72 R |
| 3,936,213 | A | * | 2/1976 | Kappel | 408/67 |
| 4,377,191 | A | * | 3/1983 | Yamaguchi | 220/665 |
| 4,569,100 | A | * | 2/1986 | Purkapile | 15/327.2 |
| 4,921,375 | A | * | 5/1990 | Famulari | 408/67 |
| 5,160,230 | A | * | 11/1992 | Cuevas | 408/67 |
| 5,439,128 | A | * | 8/1995 | Fishman | 220/8 |
| 5,653,561 | A | * | 8/1997 | May | 408/67 |
| 5,911,338 | A | * | 6/1999 | Miller | 220/666 |
| 5,913,448 | A | * | 6/1999 | Mann et al. | 220/666 |
| 6,514,131 | B1 | | 2/2003 | Reich et al. | |
| 6,736,285 | B2 | * | 5/2004 | Stewart-Stand | 220/666 |
| 7,299,838 | B2 | * | 11/2007 | Thomas | 144/154.5 |
| 7,396,193 | B2 | * | 7/2008 | Kesten | 408/67 |
| 7,422,040 | B2 | * | 9/2008 | Thomas | 144/114.1 |
| 2002/0152731 | A1 | * | 10/2002 | Reich et al. | 55/385.1 |
| 2005/0127073 | A1 | * | 6/2005 | Kusuma et al. | 220/6 |
| 2006/0276116 | A1 | * | 12/2006 | Reich et al. | 451/453 |
| 2007/0243031 | A1 | * | 10/2007 | Yun | 408/67 |
| 2008/0230462 | A1 | * | 9/2008 | Curtin | 210/232 |

FOREIGN PATENT DOCUMENTS

| CN | 2743252 | 11/2005 |
|---|---|---|
| DE | 199 24 547 | 11/2000 |
| DE | 101 17 310 | 10/2002 |

\* cited by examiner

*Primary Examiner* — Maurina Rachuba
(74) *Attorney, Agent, or Firm* — Michael J. Striker

(57) ABSTRACT

The invention is based on a dust container of a portable power tool for receiving machining residues of a portable power tool (2), comprising a container (8) predetermining a receiving volume (14). It is proposed that the container (8) have a variation means (12) for varying the size of the receiving volume (14).

1 Claim, 2 Drawing Sheets

DUST CONTAINER OF A HAND-HELD POWER TOOL

RELATED ART

The present invention relates to a dust container of a hand-held power tool according to the preamble of claim 1.

With hand-held power tools, such as grinders, drills, hammers, circular saws, planers, and the like, particles, material chips, or dust are produced, which spread into the surroundings of the hand-held power tool. To avoid contaminating the surroundings around the hand-held power tool in this manner, dust bags or dust boxes are known that are connectable to an outlet of a fan or a suction system, which include a filter element and withhold and collect dust and material chips. A hand-held power tool of this type with integrated dust extraction and a dust-proof dust box located downstream of the dust extraction is known, e.g., from DE 199 24 547 A1.

ADVANTAGES OF THE INVENTION

The present invention is directed to a dust container for a hand-held power tool for receiving machining residue from a hand-held power tool with a container, which defines a receiving volume.

It is provided that the container includes a variation means, which is provided to vary the size of the receiving volume. The dust container of a hand-held power tool may be made small, e.g., for transport or storage, or for performing detailed work and producing a minimal amount of dust. When large quantities of dust are involved, the receiving volume may be adjusted for the quantity of dust, to reduce the frequency with which the container is emptied. The machining residue may be dust, material chips, particles of a grinding means, or the like. The variation means are advantageously designed in such a manner that the variation is performed manually by an operator. Advantageously, a stiffness of the container is selected such that the container automatically retains it natural shape when the size of the receiving volume is varied. As a result, the container may be prevented from automatically and accidentally increasing or decreasing in size.

In an advantageous embodiment of the present invention, the variation means include at least two stable shape states, which are characterized by different receiving volumes and which may be reversibly transferred between by applying a minimum force. In this manner, the receiving volume may be adapted to the task at hand, with the container automatically retaining the shape it was given. The variation means are designed in such a manner that they may be safely transferred between the shape states numerous times and in a reversible manner. The shape states may be discrete or continually variable shape states. Advantageously, the receiving volume may be brought into at least three discrete shape states. The stability may be understood to mean that the variation means remain essentially unvaried when a force is applied that is below the minimum force. The minimum force is advantageously between 2 N and 100 N, and preferably between 5 N and 20 N, and is approximately 10 N in particular.

Several discrete shape states may be attained in a particularly simple, economical, and stable manner when the variation means include a folding element that is provided for deformation. The folding element may include a fold structure with at least one fold, which may be unfolded or folded using a force that exceeds a predetermined minimum force. It is a bellows, for example.

In a further embodiment, the container includes a first and second region—which are at least essentially rigid—the second region being displaceable relative to the first region by varying the variation means. The movable variation means may be located between the two stable, rigid regions, and a stable container may be obtained. The second region is advantageously displaceable in the direction toward the first region, and it is advantageously displaceable away from this region.

Economical manufacture and easy handling of the container by an operator may be attained when the container is manufactured as a single piece with the variation means.

It is also provided that the dust container for a hand-held power tool includes a filter and a connecting means for connection with the hand-held power tool, the variation means being provided to vary the receiving volume in a variation region and in a variation direction when the filter and the connecting means are located in fixed positions relative to each other. In this manner, an air flow from the connecting means to the filter may be kept independent of the instantaneous size of the variable receiving volume, thereby making it possible to obtain a good filter effect independently of the position of the variation means.

It is also provided that the connecting means define a blow-in region, and that the variation region is located opposite to the filter relative to the blow-in region. This makes it possible to separate dust from the air flow between the connecting means and the filter.

Equally advantageously, the direction of variation is transverse to a blow-in direction, which is defined by the connecting means. As an alternative or in addition to, it may be advantageous, depending on the hand-held power tool, to align the variation direction with the blow-in direction, e.g., when the space available for installation of the dust container for a hand-held power tool is longitudinal in shape. In a further possibility, two variation means may be provided, which enable the size of the receiving volume to be varied in two directions. An operator may—again, depending on the hand-held power tool with which he uses the dust container—decide in which direction the region should be enlarged, without this interfering with his work.

An operator may vary the size of the receiving volume easily when the container includes a handle element for applying a force to the variation means. Advantageously, the handle is accessible from the outside and in the state in which it is installed on the hand-held power tool, so that the operator may grip the handle element and advantageously reduce or enlarge the receiving volume via pulling or pressing.

The present invention is also directed to a hand-held power tool with a dust container for a hand-held power tool of the type described above. Grinding dust or material chips are typically blown or drawn into the dust container for a hand-held power tool via a fan of the hand-held power tool. A differential pressure in the form of overpressure or a vacuum in the container therefore results during operation. To prevent the receiving volume from being accidentally increased or reduced during operation of the hand-held power tool, it is advantageous when the container remains dimensionally stable when its internal pressure changes from an ambient pressure to a differential pressure.

DRAWING

Further advantages result from the description of the drawing, below. An exemplary embodiment of the present invention is shown in the drawing. The drawing, the description and the claims contain numerous features in combination. One skilled in the art will also advantageously consider the features individually and combine them to form further reasonable combinations.

DETAILED DESCRIPTION OF THE EXEMPLARY EMBODIMENT

Figure 1:
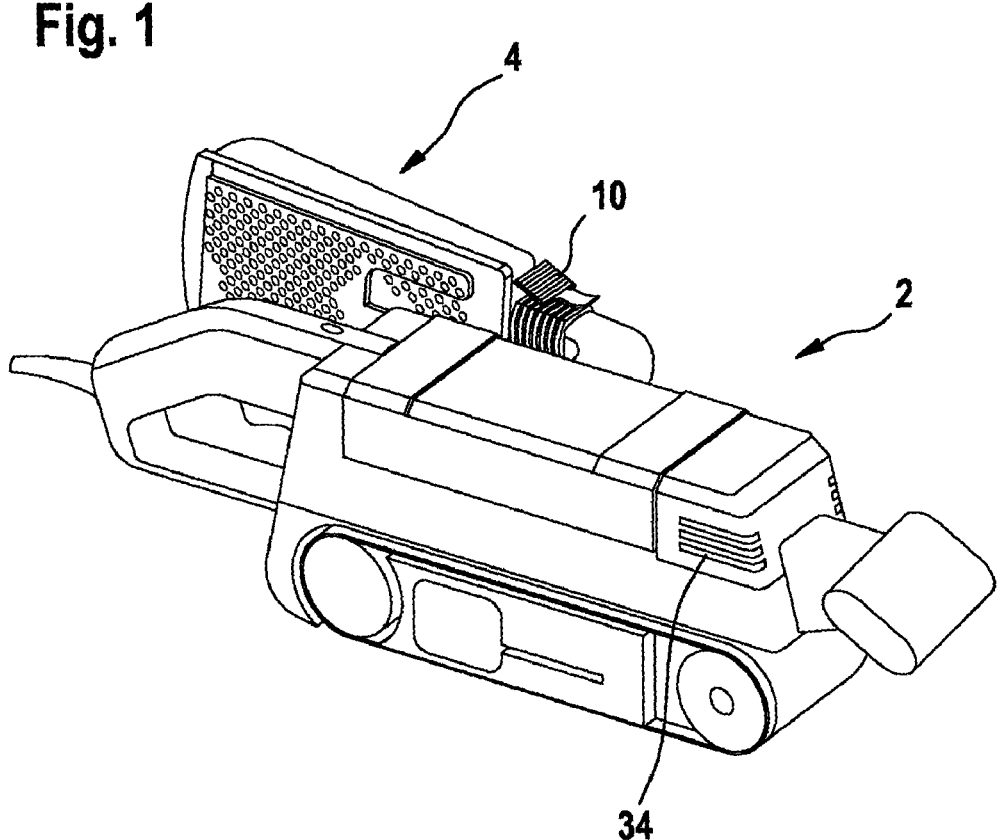
FIG. 1 shows a belt sander with a dust container.
Figure 2:
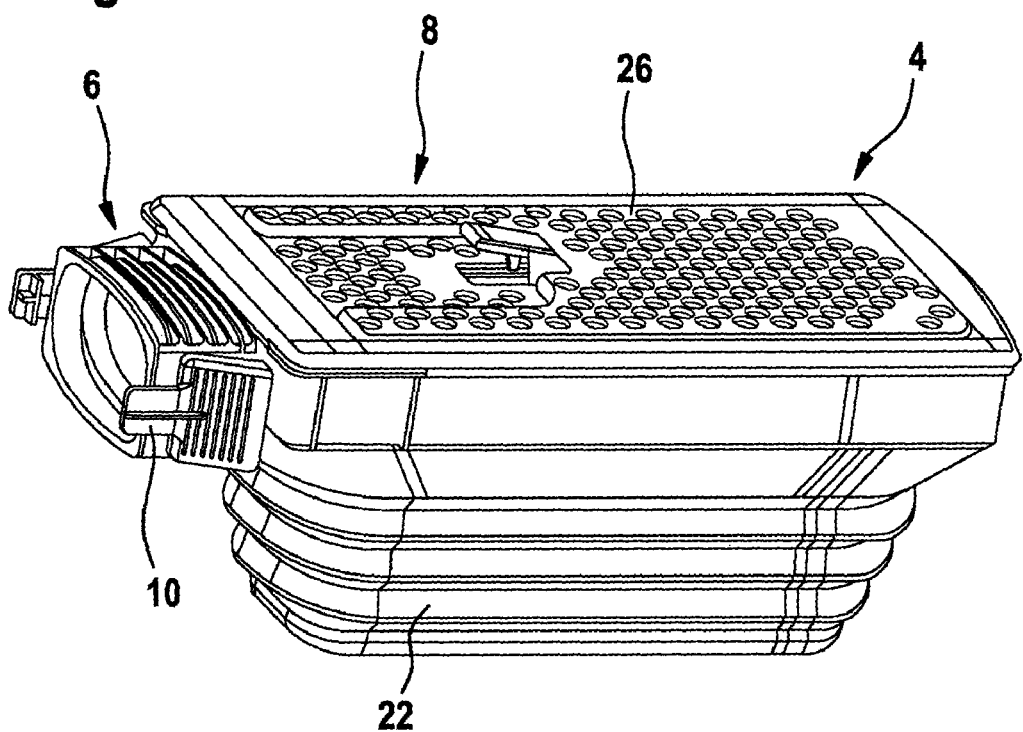
FIG. 2 shows a dust container that has been removed from the hand-held power tool.

FIG. 1 shows a hand-held power tool 2 in the form of a belt sander with an associated dust container 4 and/or a dust container of a hand-held power tool. Dust container 4, which is shown in FIG. 2 in a perspective view without hand-held power tool 2, includes connecting means 6 and a container 8 integrally formed therewith, container 8 being provided to receive dust and material chips from hand-held power tool 2.

Figure 3:
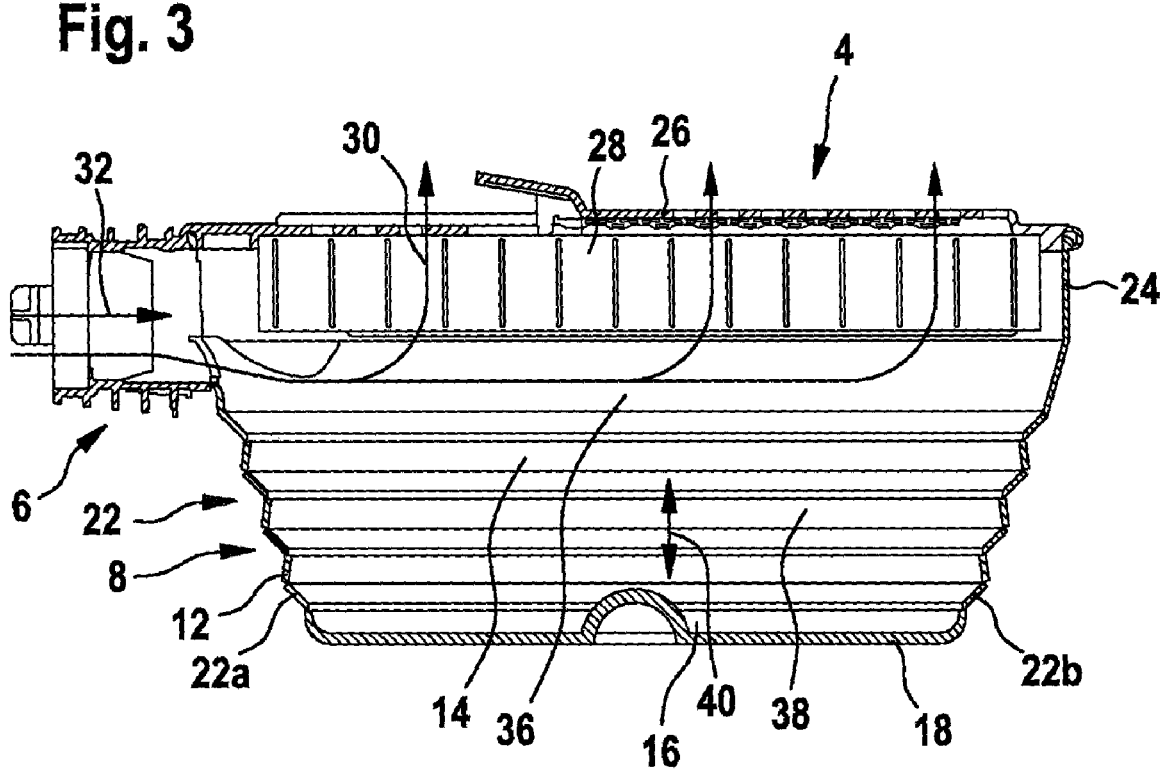
FIG. 3 shows the dust container in an unfolded state, with a large receiving volume, in a sectional view.
Figure 4:
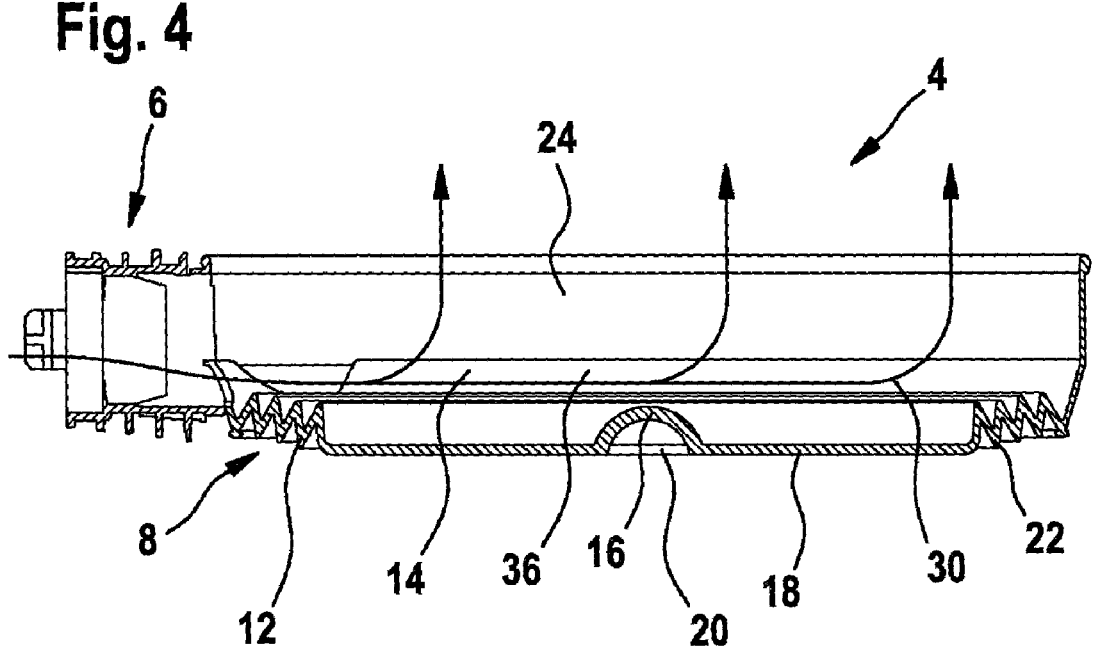
FIG. 4 shows the dust container in a folded state.

FIGS. 3 and 4 show dust container 4 in a sectional view. FIG. 3 shows it with a large receiving volume, and FIG. 4 shows it with a small receiving volume.

Connecting means 6 are integrally formed as a single piece with container 8 and include two snap-in hooks 10 for latching behind related recesses in hand-held power tool 2, by way of which connecting means 6 ensure that dust container 4 is securely fastened to hand-held power tool 2. Container 8 includes variation means 12 in the form of a folding element, via which a receiving volume 14 of container 8 may be varied by an operator. Using a handle element 16, which is integrally formed with a rigid lower region 18 of container 8, an operator may unfold and fold the folding element and thereby vary receiving volume 14, as depicted in FIGS. 3 and 4 as an example. To this end, handle element 16 includes a recess, via which an operator may reach behind a recess 20 in handle element 16 and pull rigid region 18 downward.

Folding elements 22, which are similar to an accordion and are made of an elastic plastic, are injection-moulded onto lower rigid region 18. Folds of folding elements 22 have a wall thickness of approximately 1 mm to 3 mm, and become thinner, e.g., to approximately 0.5 mm to 1 mm, at the edges, which perform a joint function and thereby enable folding to take place. Each of the four folding elements 22 includes a front section 22a and a rear section 22b, which may be folded or unfolded independently of each other. In this manner, the operator has access—in addition to the completely folded-up state shown in FIG. 4 and the completely unfolded state shown in FIG. 3—three further symmetrical, discrete intermediate states, in which the folding element is folded or unfolded evenly in the front and in the back. 2×4 further asymmetrical states are available to the operator when he unfolds or folds only front sections 22a or rear sections 22b. In this manner, the operator may select between symmetrically unfolded variation means 12 or variation means 12 that are flat in the front and deep in the rear, or vice versa, and he may adapt the shape of dust container 4 to his particular application in this manner. Since dust container 4 is connectable to a large number of different hand-held power tools, which have been left out of the figures for clarity, it is very advantageous to be able to adapt the shape of dust container 4 to a particular task by unfolding or folding the folding element accordingly.

Opposite to lower rigid region 18, container 8 includes an upper rigid region 24, on which a filter unit 26 with a filter 28 made of paper is placed. Filter 28 and connecting means 6 are always located in fixed positions relative to each other via the particular connection with rigid region 24, regardless of the state of unfolding of the folding element. In this manner, an air flow 30 always remains the same, regardless of the state of unfolding of the folding element, as indicated in FIGS. 3 and 4 (even though filter unit 26 is not shown in FIG. 4, for clarity).

Connecting means 6 define a blow-in direction 32, in which air flow 30—driven by a fan 34 of hand-held power tool 2—passes through connecting means 6 and into a blow-in region 36, through which rapid air flow 30 flows. Via a change in receiving volume 14, variation means 12 define a variation region 38, around which receiving volume 14 may be varied. Variation region 38 is located opposite to filter 28 relative to blow-in region 36, so that air flow 30 leaves variation region 38 essentially unaffected on its path to filter 28, and the dust may deposit in variation region 38. Blow-in direction 32 is oriented transversely to a variation direction 40, in which variation means 12 may be folded and unfolded. In this manner as well, dust which has deposited in variation region 38 is minimally influenced by the folding element being in a different position.

Via air flow 30, which is forced into container 8 with the aid of fan 34, an overpressure relative to the surroundings of container 8 is produced inside container 8 during operation of hand-held power tool 2. To prevent variation means 12 from becoming unfolded by this operating overpressure, folding elements 22 are designed in such a manner that they do not fold or unfold unless the operator applies a minimum force of approximately 10 N. Via the overpressure in container 8, a force is exerted on folding elements 22 that is markedly less than 10 N. In addition, this minimum force is selected so that it exceeds the weight of dust container 4 itself, i.e., folding elements 22 do not fold on their own when dust container 4 is placed on lower region 18 in the unfolded state.

In an alternative embodiment, it is also feasible to locate a variation means, e.g., in the form of a folding element, on the rear region of upper region 24 located opposite to connecting means 6, to enable the receiving volume to be varied toward the rear, e.g., because there is more space available there. It is also feasible to install a related variation means on one or both side walls. It is also advantageous to locate variation means on filter unit 26, via which filter unit 26 may be raised or lowered relative to connecting means 6.

What is claimed is:

1. A dust container of a hand-held power tool for receiving machining residue from a hand-held power tool to which the dust container is connected, comprising:
    a container including a blow-in region through which an air flow which contains dust and material chips generated by the hand-held power tool flows;
    a further region located downstream of said blow-in region and formed as a variation region in which dust and material chips deposit; and
    a variation means configured for varying a receiving volume of the variation region,
    wherein the variation means is reversibly transformable between at least two stable shape states characterized by different receiving volumes by applying a minimum force,
    wherein the variation means includes folding elements which are provided for deformation, and
    wherein each of the folding elements includes a front section and a rear section which are folded or unfolded independently of each other to achieve said at least two stable shape states and to adapt a shape of the dust container to a particular application,
    further comprising a filter unit and a further variation means, wherein said further variation means is located on said filter unit to raise or lower said filter unit relative to a connecting means provided to securely fasten said dust container to said hand-held power tool.

* * * * *